United States Patent [19]

Lang

[11] 4,175,656
[45] Nov. 27, 1979

[54] TRACK MOUNTED CARGO SHUTTLE
[75] Inventor: John M. Lang, Bellevue, Wash.
[73] Assignee: The Boeing Company, Seattle, Wash.
[21] Appl. No.: 864,734
[22] Filed: Dec. 27, 1977
[51] Int. Cl.$^2$ ............................................. B65G 25/04
[52] U.S. Cl. ................................... 198/748; 104/162; 104/176
[58] Field of Search ................ 198/746, 748; 104/162, 104/172 B, 176

[56] References Cited
U.S. PATENT DOCUMENTS

| | | | |
|---|---|---|---|
| 2,839,009 | 4/1956 | Francis | 104/172 C |
| 3,186,355 | 4/1960 | Stoll | 104/162 |
| 3,508,499 | 12/1966 | Collins | 104/176 |

Primary Examiner—Robert B. Reeves
Assistant Examiner—Brian Bond
Attorney, Agent, or Firm—Christensen, O'Connor, Johnson & Kindness

[57] ABSTRACT

A shuttle conveyor for moving articles fore and aft on a cargo support such as the baggage area in an aircraft cargo compartment comprises a shuttle carriage assembly travelling in tracks moved fore and aft by a cable. A control mechanism is provided to raise and lower selectively one of two cargo engaging pawls mounted on the shuttle carriage. The pawls are adapted to move cargo forward or aft in the compartment and are operated by a cable or chain operator.

9 Claims, 11 Drawing Figures

U.S. Patent   Nov. 27, 1979   Sheet 1 of 3   4,175,656
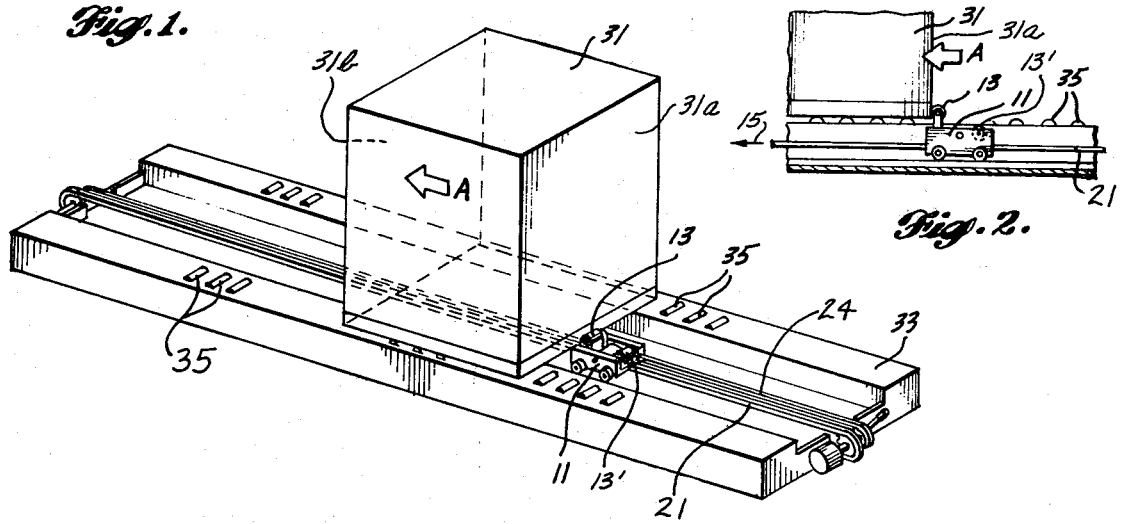
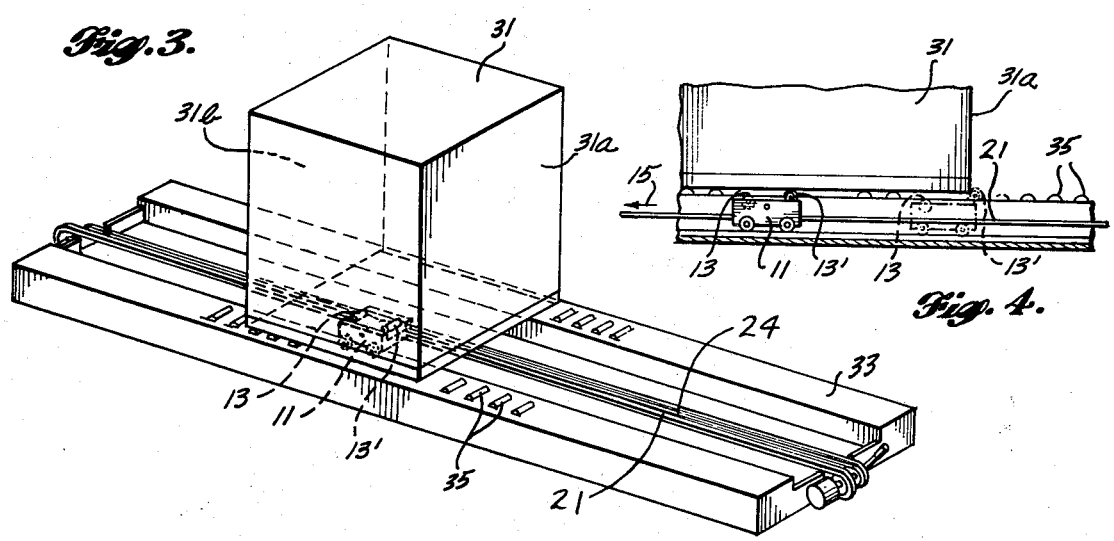
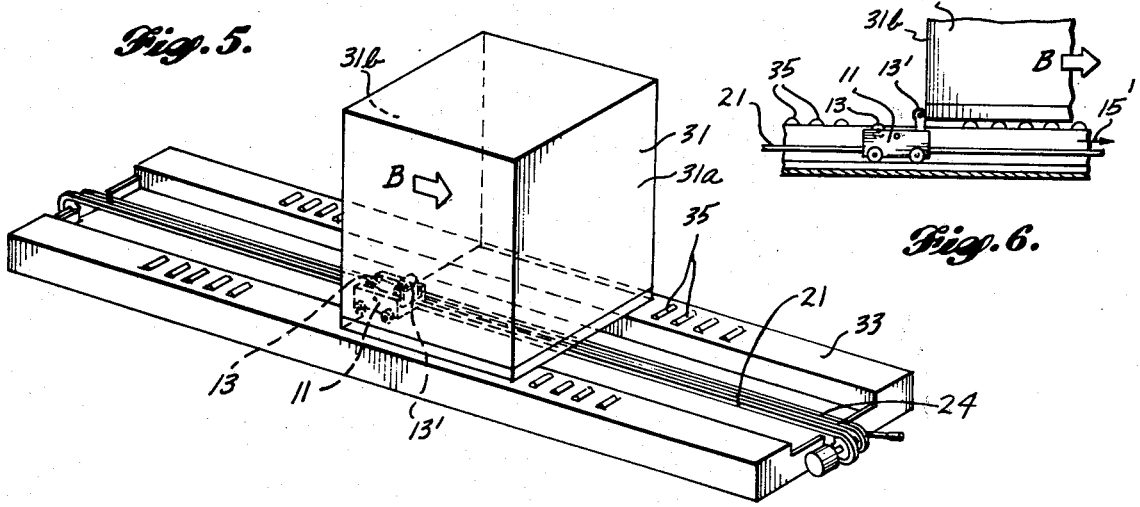

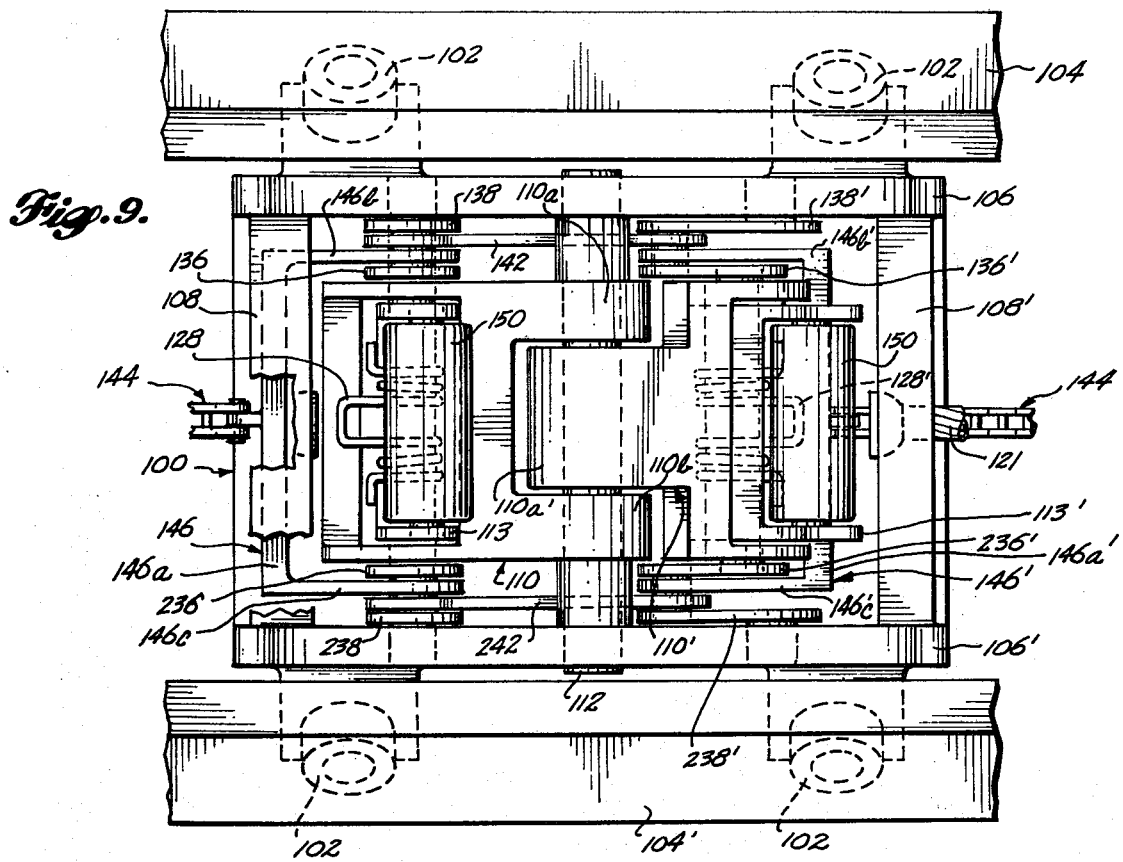
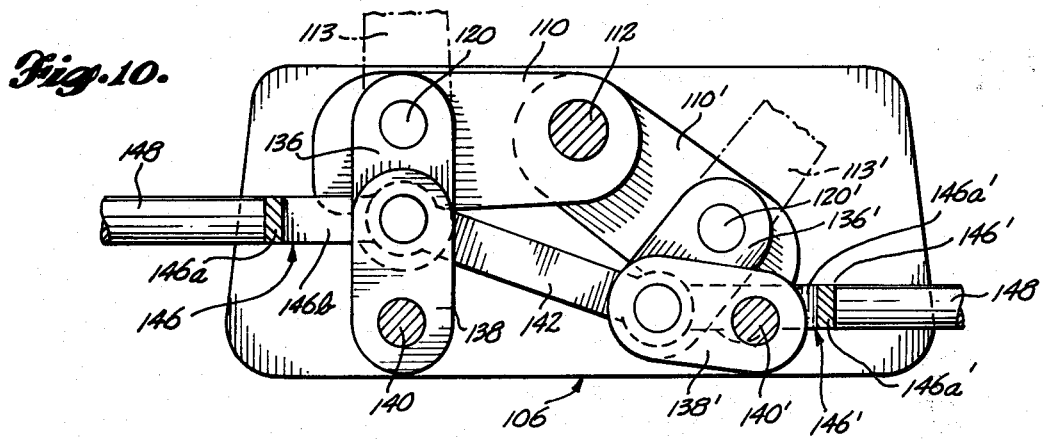
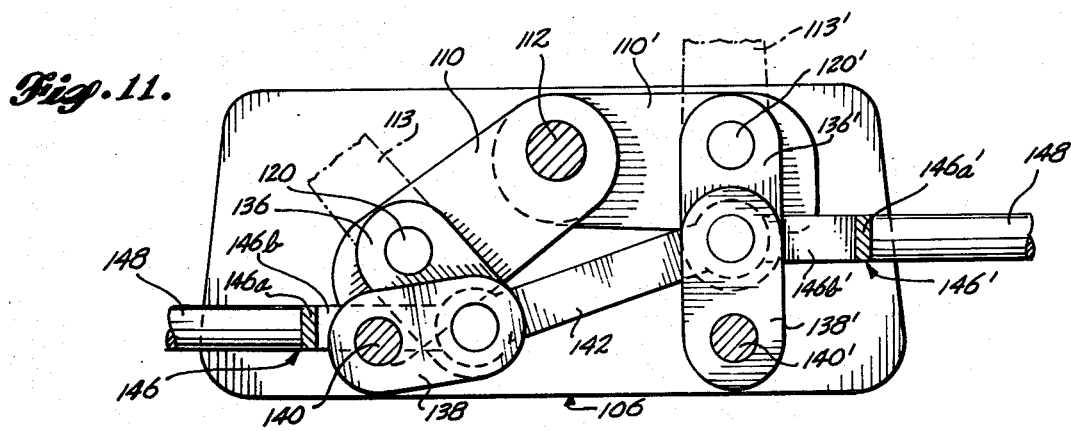

TRACK MOUNTED CARGO SHUTTLE

BACKGROUND OF THE INVENTION

This invention relates to apparatus for the handling of cargo pallets or containers in a cargo compartment such as in an aircraft, ship or train or in storage facilities for cargo containers and pallets. This invention further relates to apparatus installed in the floor of the cargo compartment for moving cargo pallets or containers into and out of a cargo compartment.

It is well-known to use cargo moving shuttle conveyors for moving articles fore and aft on a track in the floor in cargo compartments of aircraft and the like. U.S. Pat. No. 3,568,825 issued to Munger shows such a device in which a rotatable bar may be erected into a cargo engaging position by a tripping pin mechanism located in the track. In order to utilize this apparatus, it is necessary to have the shuttle conveyor moved to the location of the tripping mechanism in order to raise or lower the cargo engaging bar. While this system works suitably in many applications, it is frequently necessary to raise or lower the cargo engaging bar at a location other than the location of the tripping mechanism. In addition, the location and orientation of the tracks used in the Munger device permit ingestion of dirt and other abrasive material which occasionally clog and cause wear to the tracks.

It is therefore an object of this invention to provide a cargo shuttle for moving cargo into and out of a cargo space that solves the problems associated with the prior art described above.

An additional object of this invention is to provide a cargo transporting shuttle for an aircraft cargo deck which occupies a minimum of vertical space.

A further object of this invention is to provide a shuttle in an aircraft cargo deck which occupies a minimum amount of space between the floor of the cargo compartment and the rollers provided for movement of the cargo into and out of the cargo compartment.

SUMMARY OF THE INVENTION

An improved mechanism for transporting cargo on a roller-equipped, load bearing surface into and out of an elongated cargo storage compartment such as an aircraft cargo compartment includes a shuttle carriage which moves on a track means extending along the path of travel of the cargo in the cargo compartment. The shuttle carriage has wheels mounted rotatably thereon for movement along the track means and includes a frame upon which are mounted a first and a second cargo engaging pawl. The shuttle carriage assembly also includes a first and a second rocker arm, each of the rocker arms having a first and a second end. Means are provided for mounting the first and second pawls respectively to the first ends of the first and second rocker arms and means are provided for pivotally mounting the second ends of the rocker arms to the frame. The several means referred to above are pivotally mounted to each other so that each of the pawls can move between an extended position, in which the pawl extends from the frame and engages the cargo, and a nested position, in which the pawl is out of engagement with the cargo, A control means is associated with the first and second rocker arms for controlling the movement of the first and second pawls between the extended position and the nested position. A draw cable means associated with the carriage assembly is provided for moving the carriage along the track means.

In a preferred form of the invention means are included for rotatably mounting the first and second pawls on the first and second rocker arms respectively for movement between an erect position and a reclined position. A biasing means associated with each of the rocker arms and pawls is provided to bias the pawls into the erect position.

Also in a preferred form of the invention the control means includes a control means disposed within the track means and a scissors linkage means associated with the control mechanism and the first and second rocker arms. The scissors linkage means is operable by movement of the control means relative to the shuttle frame to move the first and second pawls between their respective extended and nested positions.

BRIEF DESCRIPTION OF THE DRAWINGS

A better understanding of the present invention can be derived by reading the ensuing specification in conjunction with the accompanying drawings, wherein:

FIG. 1 is a diagrammatic perspective view of a cargo moving shuttle constructed in accordance with this invention shown moving a cargo container over a load bearing surface.

FIG. 2 is a side elevational view of the apparatus shown in FIG. 1.

FIG. 3 is a diagrammatic perspective view of the apparatus shown in FIG. 1 with the shuttle means shown traversing beneath the cargo container.

FIG. 4 is a side elevational view of the apparatus shown in FIG. 3.

FIG. 5 is a diagrammatic perspective view of the apparatus of this invention shown moving a cargo container in a direction opposite to the direction shown in FIG. 1.

FIG. 6 is a side elevational view of the apparatus shown in FIG. 5.

FIG. 9 is a plan view of the apparatus shown in FIG. 7.

FIG. 10 is a side elevational view corresponding to FIG. 7 with certain parts omitted for clarity.

FIG. 11 is a side elevational view corresponding to FIG. 8 with certain parts omitted and simplified for clarity.

DETAILED DESCRIPTION

Figure 7:
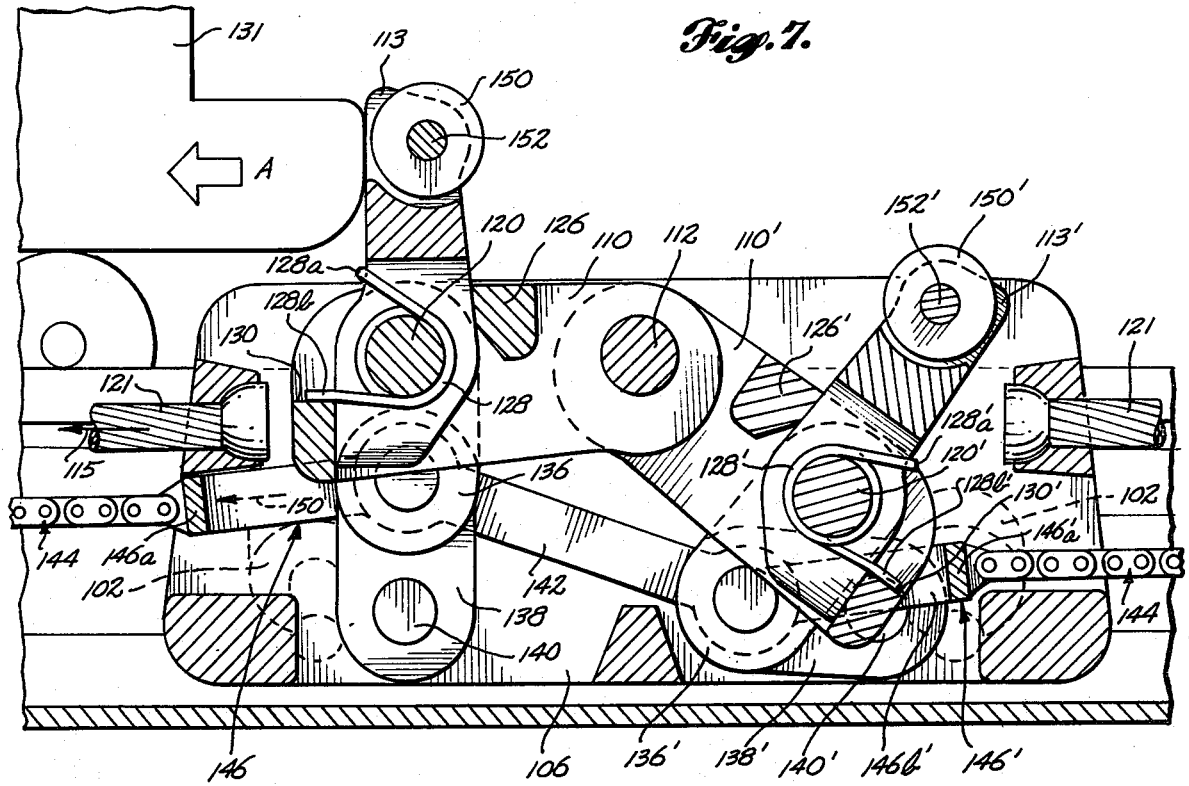
FIG. 7 is a side elevational view, partly in section, of a cargo shuttle made in accordance with the principles of this invention and having a first pawl extended.

Referring to FIGS. 1-6, a shuttle carriage 11 is shown moving cargo 31 over a cargo bed 33. A plurality of cargo rollers 35 are installed in the cargo bed 33 to reduce the friction between the cargo 31 and the cargo bed 33. The cargo 31 can be any container, pallet or other handling device well-known in the art. The shuttle carriage 11 has first and second cargo engaging pawls 13 and 13' respectively mounted thereon. Each of the pawls 13 or 13' is movable between an extended position in which the pawl is generally upright and contacts the cargo 31 and a nested position in which the pawl lies substantially within the frame of the shuttle carriage 11. As shown in FIGS. 1 and 2, the first pawl 13 is in the extended position and the carriage is positioned adjacent a first side 31a of the cargo so that the upright pawl 13 contacts the lower edge of the first side 31a. The second pawl 13' is in the nested position residing below the bottom surface of the cargo 31. A draw cable 21 is attached to the carriage 11 and driving forces are applied to the draw cable 21 in a first direction as shown by an arrow 15 in FIG. 2 to urge the shuttle carriage 11 in the first direction and thereby urge the cargo 31 in the same first direction as shown by an arrow A in FIGS. 1 and 2.

The extended and retracted positions of the pawls 13 and 13' can be reversed so that the shuttle can be used to move cargo in a second direction opposite the first direction. After the position of the pawls are reversed, the carriage is moved under the cargo 31 and when it reaches the opposite side, the second pawl 13' moves to an upright position so that it can then contact the lower edge of a second opposite side 31b of the cargo. Preferably, the pawls 13 and 13' are rotatably mounted on the shuttle carriage 11 for swinging movement between an erect position and a reclined position. The pawls 13 and 13' are arranged so that the first pawl 13 is used to push the cargo 31 in the first direction and the second pawl 13' is used to push the cargo 31 in the second direction. A stop is provided in the frame which prevents the first pawl 13 from being urged downwardly by cargo 31 when the shuttle is pulled in the first direction. Likewise, a stop is provided which prevents the second pawl 13' from being urged downwardly by the cargo 31 when the shuttle is pulled in the second direction. The stops will be described in greater detail below. FIGS. 3 and 4 illustrate the shuttle carriage 11 in transit from a position adjacent the first side 31a of the cargo to a position adjacent the second side 31b of the cargo. The first pawl 13 is placed in the nested position and the second pawl 13' is in the extended position. The position of the pawls is controlled preferably by the movement of an actuating mechanism which includes an elongated cable 24 associated with the pawls and disposed within the cargo bed 33 along the path of travel of the cargo 31. A preferred construction of the actuating mechanism will be described in detail later.

Referring now to FIG. 4, when the carriage is moved in a direction opposite to that in which it is to be used to move the cargo 31, the extended pawl 13 or 13' is urged by the cargo into a reclined position. When the second pawl 13' is in the extended position, a pulling force is applied to the draw cable 21 in the first direction as shown by the arrow 15 thereby urging the shuttle carriage 11 to move in the first direction. As the second pawl 13' engages the first side 31a of the cargo, the pawl is urged toward the second direction and downwardly, that is, toward the reclined position by the lower edge of the first side 31a of the cargo 31 as shown by the phantom line shuttle in FIG. 4. Contrary to the condition in which the second pawl 13' is extended and the shuttle is moving in the second direction, no stop is provided which prevents the second pawl 13' from being urged downwardly by the cargo when the second pawl 13' is extended and the shuttle is moved in the first direction. The second pawl 13' remains in the reclined position as it translates beneath the cargo. A biasing force is applied to the pawl to urge the pawl upwardly toward its erect position. However, the pawl is restrained from upward rotation by the lower surface of the cargo 31 until the shuttle 11 translates sufficiently to allow the second pawl 13' to clear the underside of the cargo 31, at which time the biasing force erects the second pawl 13'. The second pawl 13' is then in position to move the cargo 31 in the second direction as shown in FIGS. 5 and 6 and described above. When the first pawl 13 is in the nested position and the second pawl 13' is in the extended erect position engaging a second opposing side 31b of the cargo 31 a driving force is applied to the draw cable 21 in a second direction as shown by an arrow 16 in FIG. 6, thereby urging the shuttle carriage 11 and in turn the cargo 31 in the second direction as shown by an arrow B in FIGS. 5 and 6.

Referring now to FIGS. 7 and 9, a preferred embodiment of a shuttle carriage made in accordance with the principles of this invention comprises a generally rectangular frame 100 upon which four wheels 102 are rotatably mounted. The carriage 100 is supported by the wheels 102 for movement along the extension of a pair of tracks 104 and 104'. Each of the tracks 104 and 104' preferably comprises a U-shaped channel, the tracks 104 and 104' opening toward each other and being canted downwardly. The wheels 102 are mounted on the corners of the frame 100 and are oriented to engage and be guided by the tracks 104 and 104'. The tracks 104 and 104' could be any well-known track and could be oriented such that they open away from one another or could be canted in a direction other than downwardly. However, the downward cant of the tracks is preferred because it allows any dirt or other extraneous matter which may become lodged in the tracks to gravitate out of the tracks so that it will not increase the friction between the tracks and the wheels 102 or entirely block the movement of wheels 102 along the tracks 104 and 104'.

The frame 100 comprises first and second elongate side members 106 and 106' oriented in generally parallel spaced relation to one another. First and second elongate cross members 108 and 108' are disposed transversely to the side members 106 and 106' and join opposite ends of the side members 106 and 106' so that the side members 106 and 106' and the cross members 108 and 108' form a generally rectangular shape when viewed in plan. Preferably, the sidewalls 106 and 106' and cross members 108 and 108' are formed in a single unit.

First and second rocker arms 110 and 110' respectively are located within the frame 100. The first rocker arm is pivotally attached to the frame by a rocker pivot pin 112 which extends across the frame 100 intermediate and generally parallel to the cross members 108 and 108'. Mutually aligned pivot pin holes are provided in the respective side members 106 and 106'. The pivot pin 112 spans the width of the frame and has its ends extending into respective ones of the holes to centrally locate the pivot pin 112 in orthogonal relationship to the sides of the frame. The rocker pivot pin 112 passes through mounting holes formed in spaced arms 110a and 110b which extend from a first end of the rocker arm 110. A single arm 110a' extends from a first end of the second rocker arm 110' and is disposed between the spaced arms 110a and 110b. The rocker pivot pin 112 passes through a hole formed in the single arm 110a and extending therethrough. The rocker arms 110 and 110' are free to pivot upwardly and downwardly about a generally horizontal axis defined by the rocker pivot pin 112.

The nonadjacent second ends of the first and second rocker arms 110 and 110' are yoke shaped for receiving the lower ends of a first pawl 113 and a second pawl 113'. The first pawl 113 is pivotally mounted by means of a pawl pivot pin 120 which passes through aligned holes formed in the rocker arm 110 and the lower end of the pawl 113 respectively. The second pawl 113' is similarly pivotally mounted on the second rocker arm 110' by means of a second pawl pivot pin 120' which passes through aligned holes formed respectively through the second rocker arm 110' and the lower end of the second pawl 113'.

Figure 8:
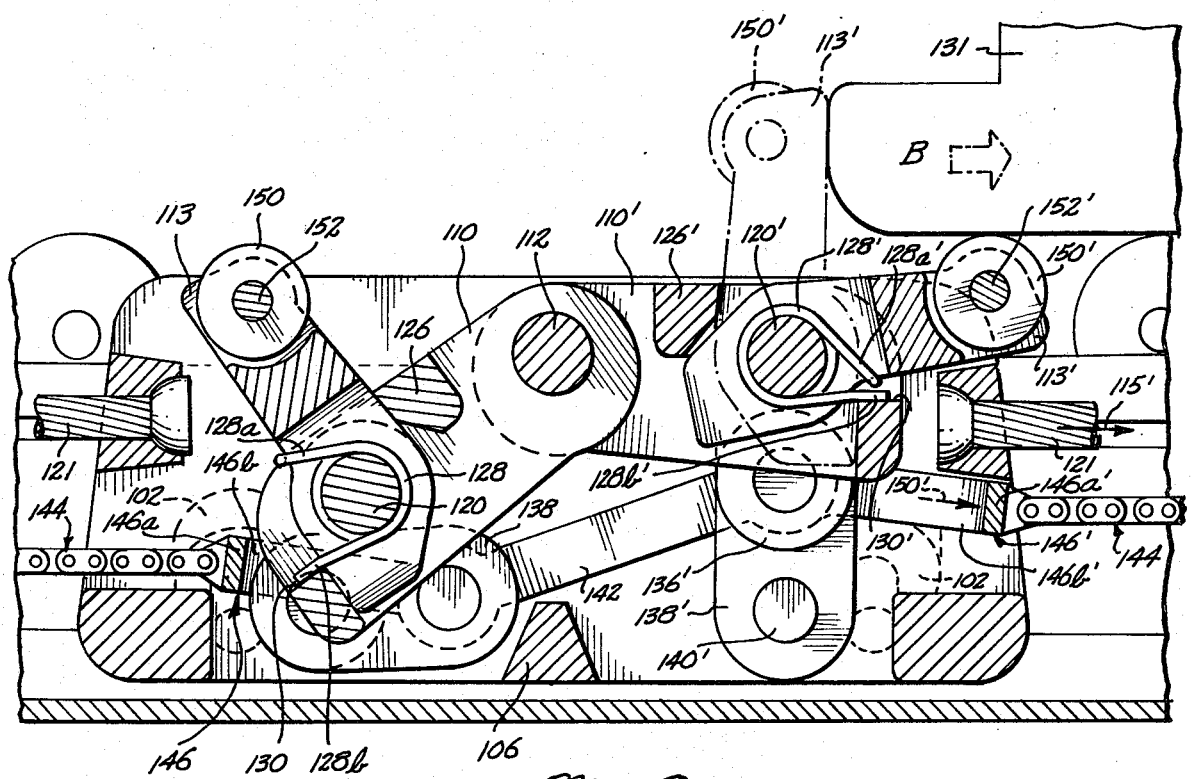
FIG. 8 is a side elevational view of the apparatus shown in FIG. 7 having the first pawl nested and the second pawl extended and traversing beneath the cargo container.

Each of the first and second pawls 113 and 113' is free to rotate about a generally horizontal axis defined by its associated pawl pivot pin 120 or 120' relative to the rocker arms 110 and 110'. The rotation of the first pawl 113 in a clockwise direction as shown in FIGS. 7 and 8 is restrained by a first pawl abutment 126 which is formed as a part of the first rocker arm 110. When the first pawl 113 is urged in the clockwise direction past a position in which the pawl is generally orthogonal to the rocker arm 110, the pawl contacts the first pawl abutment 126 and is restrained from further clockwise movement. Similarly, the rotation of the second pawl 113' in a counterclockwise direction, as shown in FIGS. 7 and 8, is restrained by a second pawl abutment 126' formed as a part of the second rocker arm 110'. The first pawl 113 is biased into an erect position against the first pawl abutment 126 by a first coil spring 128 and the second pawl 113' is biased into an erect position against the second pawl abutment 126' by a second coil spring 128'. The coils of the first coil spring 128 surround the first pawl pivot pin 120, and a first end 128a is hooked around the first pawl at a location above the pawl pivot pin 120. A second end 128b of the first spring extends from the coiled portion of the spring and abuts the upper surface of a ledge 130 formed as a part of the first rocker arm 110. The second spring 128' is similarly mounted on the second rocker arm 110', a first end 128a' being hooked around the second pawl 113' and a second end 128b' abutting a second ledge 130' formed as a part of the second rocker arm 110'.

Referring to FIG. 8, when the second pawl 113' is in the reclined position, the first end 128a' of the second spring 128' is urged downwardly by the second pawl 113' toward the ledge 130' and the second end 128b'. The downward movement of the first end 128a' causes the spring 128' to twist and compress. A torsional force is created within the spring 128' tending to oppose the twisting and thereby tending to urge the first end 128a' and in turn the second pawl 113' upwardly. The upward movement of the second pawl 113' is stopped by the under surface of a cargo container 131. However, when the shuttle has moved sufficiently to allow the upper end of the second pawl to clear the under surface of the cargo container 131, the second pawl 113' wll be urged upwardly by the second spring 128' to its erect position.

In FIG. 7 the first pawl 113 is shown extended from the frame 100 and in contact with the lower edges of a first side 131a of the cargo container 131. A first side 113a of the first pawl 113 abuts the cargo container 131. When a force is applied to a draw cable 121 in a first direction as shown by an arrow 115, the frame 100 is urged in the first direction. The first pawl 113 is prevented from rotating in a clockwise direction by the first pawl abutment 126 and therefore the first pawl 113 urges the cargo container 131 in the first direction as shown by the arrow A. In FIG. 7 the second pawl 113' is shown in the nested position. The upper end of the pawl 113' lies below the bottom surface 131c of the cargo container 131.

FIG. 8 shows the frame 100 positioned beneath the cargo container 131. In FIG. 8, the first pawl 113 is in the nested position while the second pawl 113' is in the extended but downwardly rotated (reclined) position. The second pawl 113' is reclined with respect to the rocker arm 110' and is being forced downwardly by the underside of the cargo container 131. After the frame 100 has moved sufficiently for the upper end of the second pawl 113' to clear the bottom of the cargo container 131, the second spring 128' will urge the second pawl 113' upwardly into its erect position against the second pawl abutment 126'. The erect position of the second pawl 113' is shown in phantom outline in FIG. 8. When a force is then applied on the draw cable 121 in a second direction as shown by an arrow 116, a first side 113a' of the second pawl 113' will abut the cargo 131 and urge the cargo container in the second direction as shown by the phantom outline arrow B in FIG. 8.

The linkage used to move the first and second rocker arms and the first and second pawls is located along both sides of the rocker arms and is interposed between the rocker arms and sidewalls 106 and 106' as seen in FIG. 9. The linkage adjacent sidewall 106 is the mirror image of the linkage located adjacent the sidewalls 106', and both sets of linkage operate identically and in unison with one another upon opposite sides of the rocker arms 110 and 110'. In the sectional view of FIGS. 7 and 8 only the linkage adjacent the sidewall 106 is visable. The orientation and mounting of the linkage will be described in reference to FIGS. 7 and 8. It will be understood that for each link described there is a mirror image link adjacent the sidewall 106' but not visible in FIGS. 7 and 8. Referring now to FIGS. 7 and 8, the control linkage comprises a first and second upper scissors link 136 and 136' respectively, each of the upper scissor links 136 and 136' having an upper end 136a and 136a' and a second lower end 136b and 136b' respectively. The upper end 136a of the first upper scissor link is pivotally attached to the first pawl 113 and first rocker arm 110 at the point of attachment of the first pawl 113 to the first rocker arm 110 by means of the pawl pivot pin 120 passing through a hole formed in the upper end of the upper scissor link. Similarly, the upper end 136a' of the second upper scissor link is pivotally attached to the second pawl 113' and second rocker arm 110' at the point of attachment of the second pawl 113' to the second rocker arm 110'. The lower end 136b of the first upper scissor link is pivotally attached to an upper end 138a of the first lower scissors link. A lower end 138b of the first lower scissor link is pivotally attached to the sidewall 106 by means of a linkage pivot pin 140 which extends from the sidewall 106 and passes through a hole formed in the lower end 138b of the first lower scissor link. The lower end 136b' of the second upper scissor link is pivotally attached to an upper end 138a' of a second lower scissor link 138. A lower end 138b' of the second lower scissor link 138' is pivotally attached to the sidewall 106 by means of a second linkage pivot pin 140' which extends from the sidewall 106 and passes through a hole formed in the lower end 138b' of the second lower scissor link. The first set of scissor links and the second set of scissor links are joined by a rigid connecting link 142 which has a left end 142a and a right end 142b (as viewed in FIGS. 7 and 8). The left end 142a is pivotally attached to the first upper and first lower scissor links 136 and 138 at their point of attachment to each other and the right end 142b is pivotally attached to the second upper scissor link 136' and second lower scissor link 138' at the point of attachment of the second upper and second lower scissor links to one another. The arrangement of the scissor links is such that when the upper and lower scissor links are generally aligned in an upright direction, the rocker arm and pawl associated with those scissor links is urged upwardly to place the pawl in its extended position, ready to move the cargo container 131 in either a first or a second direction depending on which of the pawls 113 or 113' is erected. When the upper and lower scissor links pivot about their common point of attachment the upper end of the upper scissor link approaches the lower end of the lower scissor link and the rocker arm and pawl associated with that pair of scissor links is urged downwardly, placing the pawl in the nested position.

The movement of the first and second pairs of scissor links and the first and second pawls is initiated by the relative movement of a control chain 144 which is attached to the respective sets of scissor links by means of control members 146 and 146'. One end of the chain 144 is attached to an outer end portion 146a of the control 146. The outer end portion 146a is elongate and lies generally parallel to the cross member 108, a first arm 146b extends orthogonally from a first end of the first portion 146a adjacent sidewall 106, the first arm is pivotally attached to the first upper and lower scissor links 136, 138 and the connecting link 142 at their common point of attachment. A second arm 146c extends orthogonally from a second end of the first portion 146a adjacent the sidewall 106'. The second arm 146c is pivotally attached to the scissor links 236, 238 and connecting link 242 at their common point of attachment as shown in FIG. 9. The other end of the chain 144 is attached to a first portion 146a' of a second control member 146' which is the mirror image of the first control member 146. The second control member 146' is pivotally attached to the scissor links associated with the second rocker arm 110' in a manner similar to that in which the first control member 146 is attached to the scissor links associated with the first rocker arm 110. The middle portion of the chain 144 passes beneath the frame 100 and lies along the path of travel of the cargo. At one or the other of the ends of the cargo compartment, the chain passes over a tensioning pulley (not shown). The pulley is controllable to place tension on the chain in either a forward or aft direction along the cargo compartment.

When the first pawl 113 is in its extended position, the first upper and lower scissor links 136 and 138 are in generally upright alignment and tension on the control chain 144 is in the first direction as shown by an arrow 115 in FIG. 7. To reverse the position of the pawls 113 and 113', the tension in the control chain 144 is shifted to the second direction as shown by an arrow 115' in FIG. 8. The shift in tension of the control chain moves the control members 146 and 146' to the right as shown in FIGS. 7 and 8 and in turn shifts the common point of attachment of the first and second pairs of scissor links to the right. The lower end of the first lower scissor link 138 is restrained from movement upwardly and downwardly by the first linkage pivot pin 140. Therefore, when the upper end 138a of the first lower scissor link is moved to the right, the lower scissor link rotates about the linkage pivot pin 140 in a clockwise direction. This movement pulls the lower end of the first upper scissor link 136 along with it and in turn moves the upper end of the first upper scissor link 136 toward the second end of the first lower scissor link 136. The first upper scissor link 136 urges the first rocker arm 110 to rotate downwardly about the rocker pivot pin 112. As the rocker arm 110 rotates downwardly, it urges the first pawl 113 downwardly into its nested position. At the same time, the upper end of the second lower scissor link 138' is rotated in a clockwise direction by the tension on the chain 144 and urges the second pair of scissor links 136', 138' into a generally upright alignment, thereby urging the second rocker arm 110' upwardly, placing the second pawl 113' into the extended position. The right/left movement (as viewed in FIG. 8) of the upper end of the first and second upper scissor links is restrained by the rocker pivot pin 112. It will be appreciated that the rigid nature of the connecting link 142 prevents both rocker arms and pawls to be in the extended position at the same time. When the first set of scissor linkage moves into its upright aligned position, the second set must necessarily move to its nonaligned position and vice versa because of the rigidity of the connecting link 142.

FIGS. 10 and 11 show the basic elements of the scissors linkage and control elements in a diagrammatic form. The pawls 113 and 113' are shown only partially and in phantom and the details of the linkage mountings is not shown. From FIGS. 10 and 11 the workings of the control linkages are readily apparent. The position of the rocker arms 110, 110' and pawls 113 and 113' in FIG. 10 corresponds to the position of those elements in FIG. 7. The first pawl 113 is in the extended position, that is, the pawl is generally upright and extends above the top of the sidewall 106. The first rocker arm 110 is generally orthogonal to the first pawl 113. The first upper and first lower scissor links 136 and 138 are aligned along their longitudinal axes and are generally parallel to the first pawl 113. The second pawl 113' is in the nested position in FIG. 10 and the second rocker arm 110' is canted downwardly from the rocker pivot pin 112. The second upper and second lower scissor links 136' and 138' are not aligned and the point of attachment of the scissor links 136', and 138' to one another is located to the left as viewed in FIG. 10 of the second pawl pivot pin 120'. The second scissor links are collapsed so that the upper end of the second upper scissor link 136' is adjacent the lower end of the second lower scissor link 138'.

In FIG. 11 (which corresponds to FIG. 8) the first pawl 113 is shown in the nested position and the second pawl 113' is in the extended position, generally upright. The second rocker arm 110' is orthogonal to the second pawl 113' and generally horizontal as viewed in FIG. 11. The first rocker arm 110 is canted downwardly from the rocker pivot pin 112. The change in position of the pawls and rocker arms is caused by the operation of the control element 148 upon the first and second sets of scissor links when a force is exerted on the control element 148 in a direction to the right as viewed in FIGS. 10 and 11. The point of attachment of the second upper and lower scissor links 136', 138' to one another is urged to the right, which in turn causes the second lower scissor link 138' to rotate clockwise about second linkage pivot pin 140' thereby urging the second upper scissor link 136' upwardly and causing the second rocker arm 110' to rotate counterclockwise about the rocker pivot pin 112. The second rocker arm 110' rotates until the second upper and lower scissor links 136', 138' are aligned upright at which time further rotation is restrained by the second linkage pivot pin 140'.

As the point of attachment of the second upper and lower scissor links 136', 138' moves to the right, the rigid connecting link 142 urges the point of attachment of the first upper and lower scissor links 136, 138 to one another to the right and downwardly. The first lower scissor link 138 thereby rotates in a clockwise direction about the first linkage pivot pin 140. As the first lower scissor link 138 rotates it urges the first upper scissor link 136 downwardly, thereby rotating the first rocker arm 110 counterclockwise about the rocker pivot pin 112. As the first rocker arm 110 rotates, the upper end of the first upper scissor link 136 approaches the lower end of the first lower scissor link 138, that is, the scissor links approach a collapsed condition. To reverse the positions shown in FIG. 11 to those shown in FIG. 10 the control element 148 is moved to the left relative to the sidewall 106 and the above-described linkage movement occurs in mirror image fashion to urge the first pawl upwardly and the second pawl downwardly.

As the shuttle passes beneath the cargo container 31 as shown in FIG. 8 the pawl 113' is in the reclined position and is constantly being urged against the bottom of the cargo container 131 by the pawl spring 128'. In order to reduce friction and ease the transit of the pawl 113' beneath the container, a pawl roller 150' is mounted on the upper end of the pawl 113'. Similarly, a pawl roller 150 is mounted on the first pawl 113. The pawl roller 150 extends beyond the second side 113b of the pawl 113 and the pawl roller 150' extends beyond the second side 113b' of the second pawl 113'. The pawl rollers 150 and 150' are mounted on pawl roller pins 152, 152' respectively.

Although a preferred embodiment of the cargo shuttle of this invention has been described and illustrated, it will be understood by those skilled in the art and others that several changes can be made while still remaining within the scope of the present invention. For example, the draw cable attached to the cargo shuttle could be a chain rather than a cable and the actuating means used to move the pawls from their nested to their extended position could be a cable as easily as it could be a chain.

The embodiments of the invention in which an exclusive property or privilege is claimed are defined as follows:

1. An apparatus for transporting cargo over a load-bearing surface comprising:
    track means extending along the path of travel of the cargo;
    a shuttle carriage including a frame, said carriage being supported by and positioned for movement along said track means;
    first and second cargo engaging pawls;
    first and second rocker arms, each of said rocker arms having first and second ends;
    first means for mounting said first pawl on said first end of said first rocker arm for rotation of said first pawl between an erect position and a reclined position;
    second means for mounting said second pawl on said first end of said second rocker arm for rotation of said second pawl between an erect position and a reclined position;
    biasing means associated with said first and second pawls for biasing said first and second pawls into said erect positions;
    third means for pivotally attaching said second end of said first rocker arm to said frame for movement of said first rocker arm and said first pawl between an extended position in which said first pawl extends beyond said frame for engagement with said cargo and a nested position in which said first pawl lies substantially within said frame;
    fourth means for pivotally attaching said second end of said second rocker arm to said frame for movement of said second rocker arm and said second pawl between an extended position in which said second pawl extends beyond said frame for engagement with said cargo and a nested position in which said second pawl lies substantially within said frame;
    control means disposed within said track means for controlling the position of said pawl; and,
    a scissors linkage means associated with said control means and said first and second rocker arms, said scissors linkage means being operable by movement of said control means along the path of the cargo relative to said frame to place said first pawl in said extended position when said second pawl is in said nested position and to place said second pawl in said extended position when said first pawl is in said nested position.

2. The apparatus defined in claim 1 wherein said third and fourth means comprises a rocker pivot pin mounted within said frame transversely to the direction of motion of said cargo, said pivot pin having a first portion and a second portion, said first rocker arm being pivotally attached to said first portion and said second rocker arm being pivotally attached to said second portion.

3. The apparatus defined in claim 1 wherein said first and second pawls further include a roller mounted at an upper end of each of said first and second pawls for engagement with said cargo when said pawls are in said reclined position.

4. The apparatus of claim 1 wherein said scissors linkage means comprises:
    a first and a second upper scissors link, each said link having a first and a second end;
    a first and a second lower scissors link, each said link having a first and a second end;
    means for pivotally attaching said first ends of said first and second lower scissor links to said frame;
    means for pivotally attaching said first ends of said first and second upper scissor links to said first ends of said first and second rocker arms respectively;
    means for pivotally attaching said second end of said first upper scissor link to said second end of said first lower scissor link at a first attachment point;
    means for attaching said second end of said second lower scissor link to said second end of said second upper scissor link at a second attachment point;
    means for rigidly connecting said first attachment point to said second attachment point; and
    means for attaching a first end of said control means to said first attachment point and a second end of said control means to said second attachment point such that movement of said control means relative to said frame in a first direction will move said first and second attachment point in said first direction and a movement of said control means relative to said frame in a second direction will move said first and second attachment points in said second direction, said first pawl being moved from said nested position to said extended position in response to said movement of said first and second attachment points in said first direction and said second pawl being moved from said nested position to said extended position in response to said movement of first and second attachment points in said second direction.

5. The apparatus defined in claim 1 further comprising:
   a plurality of wheels; and
   means for rotatably mounting said wheels on said frame, said wheels being positioned for engagement with and movement within said track means.

6. A shuttle carriage for moving cargo over a load bearing surface comprising:
   a frame;
   first and second cargo engaging pawls;
   first and second rocker arms, each of said rocker arms having first and second ends;
   first means for mounting said first pawl on said first end of said first rocker arm;
   second means for mounting said second pawl on said first end of said second rocker arm;
   third means for pivotally attaching said second end of said first rocker arm to said frame for movement of said first rocker arm and said first pawl between an extended position in which said first pawl extends beyond said frame for engagement with said cargo and a nested position in which said first pawl lies substantially within said frame;
   fourth means for pivotally attaching said second end of said second rocker arm to said frame for movement of said second rocker arm and said second pawl between an extended position in which said second pawl extends beyond said frame for engagement with said cargo and a nested position in which said second pawl lies substantially within said frame;
   a scissors linkage means operably associated with said first and second rocker arms;
   control means operably associated with said scissors linkage means, said scissors linkage means and said control means being so constructed and arranged that movement of said control means along the path of the cargo relative to the frame will move said first and second rocker arms and first and second pawls between their respective, extended and nested positions placing said first pawl in said extended position when said second pawl is in said nested position and placing said second pawl in said extended position when said first pawl is in said nested position.

7. The apparatus of claim 6 wherein said scissors linkage means comprises:
   first and second upper scissors links, each said link having a first and second end;
   first and second lower scissors links, each said link having a first and second end;
   means for pivotally attaching said first ends of said first and second lower scissors links to said frame;
   means for pivotally attaching said first ends of said first and second upper scissors links to said first ends of said first and second rocker arms respectively;
   means for pivotally attaching said second end of said first upper scissors link to said second end of said first lower scissors link at a first attachment point;
   means for attaching said second end of said second lower scissor link to said second end of said second upper scissors link at a second attachment point;
   means for rigidly connecting said first attachment point to said second attachment point; and
   means for attaching said control means to said first and second attachment points such that movement of said control means relative to said frame in a first direction will move said first and second attachment points in said first direction and a movement of said control means relative to said frame in a second direction will move said first and second attachment points in said second direction, said first pawl being moved from said nested position to said extended position in response to said movement of said first and second attachment points in said first direction and said second pawl being moved from said nested position to said extended position in response to said movement of said first and second points of attachment in said second direction.

8. The shuttle carriage defined in claim 6 wherein said first and second means mount said first and second pawls on said first ends of said first and second rocker arms for rotation of said first and second pawls between an erect position and a reclined position, said shuttle carriage further including biasing means associated with said first and second pawls for biasing said first and second pawls into said erect position.

9. The shuttle carriage defined in claim 8 wherein said first and second pawls further include a roller rotatably mounted at an upper end of each of said first and second pawls for engagement with said cargo when said pawls are in said reclined position.

* * * * *